(12) United States Patent
Hansson et al.

(10) Patent No.: US 7,788,983 B2
(45) Date of Patent: Sep. 7, 2010

(54) SENSOR ARRANGEMENT

(75) Inventors: Johan Hansson, Skovde (SE); Ulf Nyberg, Langhem (SE)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 12/420,893

(22) Filed: Apr. 9, 2009

(65) Prior Publication Data
US 2009/0261819 A1  Oct. 22, 2009

(30) Foreign Application Priority Data
Apr. 21, 2008  (EP) .................. 08154879

(51) Int. Cl.
*G01F 1/56* (2006.01)
(52) U.S. Cl. .................. 73/861.08
(58) Field of Classification Search .............. 73/861.12, 73/861.08, 861.11; 336/218, 73
See application file for complete search history.

(56) References Cited

U.S. PATENT DOCUMENTS

| | | | |
|---|---|---|---|
| 4,793,241 A | 12/1988 | Mano et al. | |
| 5,691,484 A * | 11/1997 | Feller | 73/861.13 |
| 6,152,172 A | 11/2000 | Christianson et al. | |
| 6,279,406 B1 * | 8/2001 | Li et al. | 73/861.77 |
| 6,595,069 B2 * | 7/2003 | Frey et al. | 73/861.11 |
| 7,021,127 B2 * | 4/2006 | Schroeder et al. | 73/114.26 |
| 2005/0092100 A1 | 5/2005 | Lehker et al. | |

FOREIGN PATENT DOCUMENTS

WO  WO 2007/076750 A  7/2007

* cited by examiner

*Primary Examiner*—Jewel Thompson
(74) *Attorney, Agent, or Firm*—Daniel J. Whitman

(57) ABSTRACT

A sensor arrangement is arranged to detect at least one position of a displaceable component in a fluid device, which fluid device comprises a wall enclosing a cavity, in which cavity the component is displaced by pressurized fluid selectively applied to the component. The sensor arrangement includes a magnetic sensor mounted outside the wall and a first sensor element that is connected to the magnetic sensor and extends through the wall and a predetermined distance into the cavity. The magnetic sensor is arranged to detect the position of at least one predetermined second sensor element located on the displaceable component by sensing a change in magnetic flux induced in the first sensor element by the second sensor element.

17 Claims, 2 Drawing Sheets

SENSOR ARRANGEMENT

CROSS-REFERENCED TO RELATED CASE

The present application claims the benefit of the filing date of European Patent Application No. 08154879.4, filed Apr. 21, 2008, the disclosure of which is expressly incorporated herein by reference.

TECHNICAL FIELD

The present invention relates generally to a sensor arrangement for detecting at least one position of a displaceable component in a fluid device.

BACKGROUND ART

In fluid devices such as spool valves or directional control valves, as well as piston-cylinder devices, it is often desirable to detect the position of a spool, piston or similar in order to ensure proper operation of the fluid device. A conventional sensor used for this purpose is a magnetic sensor, commonly referred to as a Hall sensor.

U.S. Pat. No. 6,283,149 discloses a sensor arrangement for a directional control valve, where a magnetic sensor is mounted in a blind bore in the valve body. Magnets are provided in an outer radial surface of the spool, which magnets are used by the sensor for determining the position of the spool. This arrangement requires the sensor to detect a magnet through a section of the wall, which may reduce the accuracy of the sensor. The solution also requires additional machining of both the valve body, to allow mounting of the sensor, and the spool, to allow magnets to be mounted on the spool. This makes the manufacture of the valve unnecessarily complex and expensive.

WO 2007/076750 discloses an alternative arrangement for mounting a sensor. In this example, the sensor is mounted in a bore exiting in a cavity for a spool in a valve body. The sensor uses magnets mounted on a projection on the spool to detect the position thereof. This arrangement exposes the sensor to the hydraulic fluid in the cavity, which may cause the sensor to corrode and eventually malfunction. This solution also requires additional machining of the spool, to allow magnets to be mounted on the spool.

One object of the present invention is to provide an improved arrangement for detecting the position of a displaceable component in a fluid device, which arrangement solves the problems stated above. The invention aims to provide a sensor arrangement having an improved accuracy and which is less affected by hydraulic fluid.

DISCLOSURE OF INVENTION

The above problems have been solved by a method and an arrangement according to the appended claims.

According to a preferred embodiment, the invention relates to a sensor arrangement arranged to detect at least one position of a displaceable component in a fluid device. The fluid device may be a spool valve, a directional control valve, a piston-cylinder device, or similar. The fluid device comprises a wall enclosing a cavity, in which cavity the component is displaced by a fluid selectively applied to the component. The device may be operated using a suitable hydraulic, pneumatic or similar source of fluid pressure supplied from a pump, compressor, accumulator or a similar device. The sensor arrangement preferably comprises a magnetic sensor, such as a Hall sensor, mounted outside the wall, and cooperating first and second sensor elements. The first sensor element is connected to the magnetic sensor and extends through the wall and a predetermined distance into the cavity, wherein the magnetic sensor is arranged to detect the position of at least one predetermined second sensor element located on the displaceable component by sensing a change in magnetic flux induced in the first sensor element by the second sensor element. The terms "magnetic sensor", "first sensor element", "second sensor element" and their relative positions in the sensor arrangement will be adhered to throughout the examples described in the subsequent text.

By allowing the first sensor element to extend into the cavity, the distance between the first and second sensor elements can be reduced in order to improve the accuracy of the sensor. The change in the magnetic field in the first sensor element is proportional to the distance between the second sensor element and first sensor element. This will in turn allow position sensing using surfaces that are remote from any wear surfaces and which may not be available or suitable for this purpose using known sensor arrangements.

According to a first embodiment, the first sensor element that is connected to the sensor is a magnetically conductive material, such as a suitable ferromagnetic metallic material. The second sensor element mounted on the displaceable component is a magnet, such as a permanent magnet.

According to a second embodiment, the first sensor element is a magnet, while the second sensor element is a magnetically conductive material.

The magnetic sensor may be a magnetically sensing element that is formed by a Hall sensor or a pickup coil mounted on or adjacent an outer surface of the wall. In this way, the sensor is neither exposed to the fluid in the cavity of the fluid device, nor to high pressures that may occur therein. The magnetic sensor is connected to an electronic control unit or a signal detecting unit, which receives electrical pulses representing the change in magnetic flux induced in the first sensor element by the second sensor element. Based on these input signals and information relating to the fluid operation and current direction of movement of the displaceable component, the electronic control unit can determine the position of the component. The magnetic sensor may be attached on and connected to the first sensor element. The first sensor element may be mounted in a plug that encases the longitudinal surfaces of the element extending through the wall and into the cavity. If the wall comprises a magnetically conductive material, such as steel, then the first sensor element is separated from the wall by an isolating non-magnetic material. This may be achieved by providing the first sensor element with a coating of a suitable non-magnetic material or by mounting the first sensor element in a non-magnetic casing. In the latter case, the casing surrounding the first sensor element can be made from an insulating non-magnetic material. The first sensor element can be a cylindrical body, but other cross-sections are also possible.

According to one example, the displaceable component may be displaceable along a longitudinal axis and the second sensor element is an end surface of the displaceable component. This arrangement is mainly suited for detecting an end position of the displaceable component as it is displaced in the cavity.

According to a second example, the displaceable component is arranged to be displaceable along a longitudinal axis and the second sensor element comprises at least one peripheral element on the displaceable component. This arrangement is mainly suited for detecting one or more individual positions or for continuous detection of the position of the displaceable component as it is displaced in the cavity.

This may be achieved by arranging the magnetic sensor to detect the position of each of a single second sensor element or a number of consecutive and separated peripheral second sensor elements along the longitudinal axis. If the second sensor element comprises one or more magnets, then the magnet or magnets may be located in a peripheral surface of the displaceable component, or in a holder attached to an end thereof. If the second sensor element comprises a magnetically conductive material, then the consecutive elements may comprise a number of material sections of a predetermined shape arranged at the same distance from the longitudinal axis and a predetermined axial thickness, or a row of individual teeth with a predetermined spacing. For instance, the consecutive elements may comprise a number of discs having the same diameter and equal thickness. Alternatively, the consecutive elements may be arranged at different distances from the longitudinal axis. For instance, the consecutive elements may comprise a number of stepped cylindrical surfaces having successively reduced diameters, each with an equal axial extension.

The invention also relates to a fluid device comprising a sensor arrangement as described above. The fluid device may be a spool valve, wherein the position of the spool is detected by the sensor arrangement. Alternatively, the fluid device may be a fluid cylinder-piston device, wherein the position of the piston is detected by the sensor arrangement.

The invention also relates to a vehicle comprising an engine arrangement as described in the above examples.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

Figure 1:
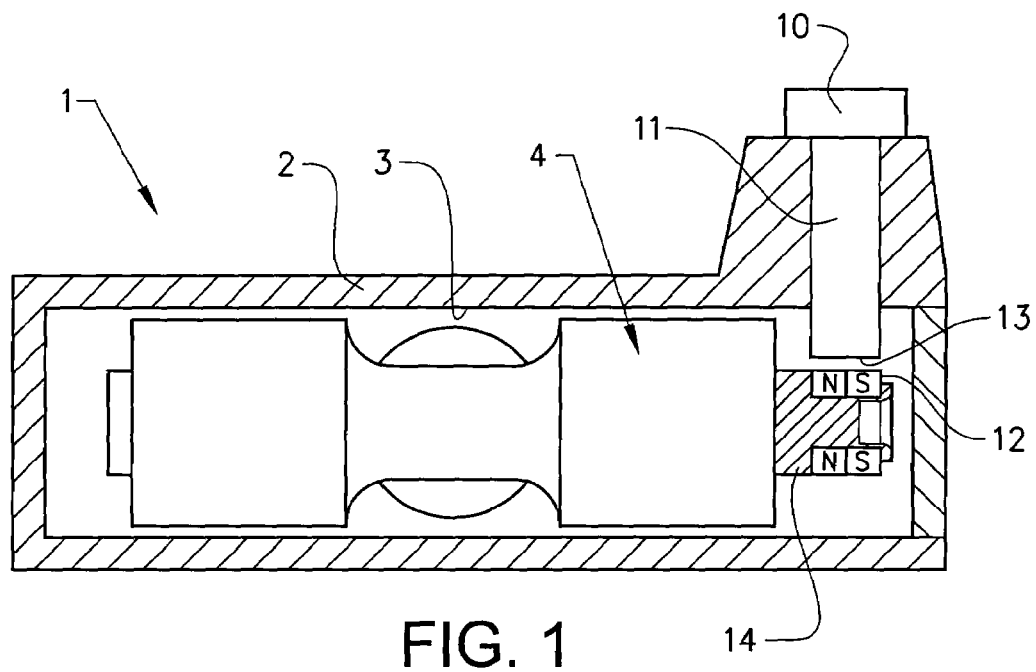
FIG. 1 shows a schematic illustration of a sensor arrangement according to a first embodiment of the invention.

FIG. 1 shows a schematic illustration of a sensor arrangement according to a first embodiment of the invention. In this example, FIG. 1 shows a fluid device in the form of a directional control valve 1. The directional control valve 1 comprises a wall 2 enclosing a cavity 3, which cavity contains a displaceable component in the form of a spool 4 that is displaced in the longitudinal cavity 3 along a longitudinal axis of the cavity by pressurized fluid selectively applied to the control valve 1. The device may be operated using a suitable hydraulic, pneumatic or similar source of fluid pressure supplied from a pump, compressor, accumulator or a similar device. The device is provided with a sensor arrangement comprising a magnetic sensor 10, such as a Hall sensor, mounted outside the wall 2 and a first sensor element 11 that is connected to the magnetic sensor 10 and extends through the wall 2 and a predetermined distance into the cavity 3. The magnetic sensor 10 is arranged to detect the position of a second sensor element 12 located on the spool 4 by sensing a change in magnetic flux induced in the first sensor 11 element by the second sensor element 12.

In FIG. 1 the first sensor element 11 comprises a cylindrical body of a magnetically conductive material that extends through the wall 2 and in a substantially radial direction into the cavity 3. The end surface 13 of the first sensor element 11 may extend as close to the outer surface of the second sensor element 12 as possible without interfering with the function thereof. The second sensor element 12 comprises a permanent magnet arranged in the outer peripheral surface of and axially extending end portion 14 of the spool 4. In this case, the second sensor element 12 is arranged around the entire periphery of the end portion 14 in order to allow position sensing to be performed even if the spool should be rotated about its axis. For a non-rotatable spool, the second sensor element 12 need only be arranged along the section of end portion 14 facing the end surface 13 of the first sensor element 11.

In the example shown in FIG. 1, the wall 2 comprises a material that is not magnetically conductive. If the wall 2 of the directional valve 1 comprises a magnetically conductive material, the first sensor element 11 would have to be insulated from the wall by a suitable non-magnetic material. One example of a suitable arrangement for this purpose is described in connection with FIG. 3 below.

Figure 2:
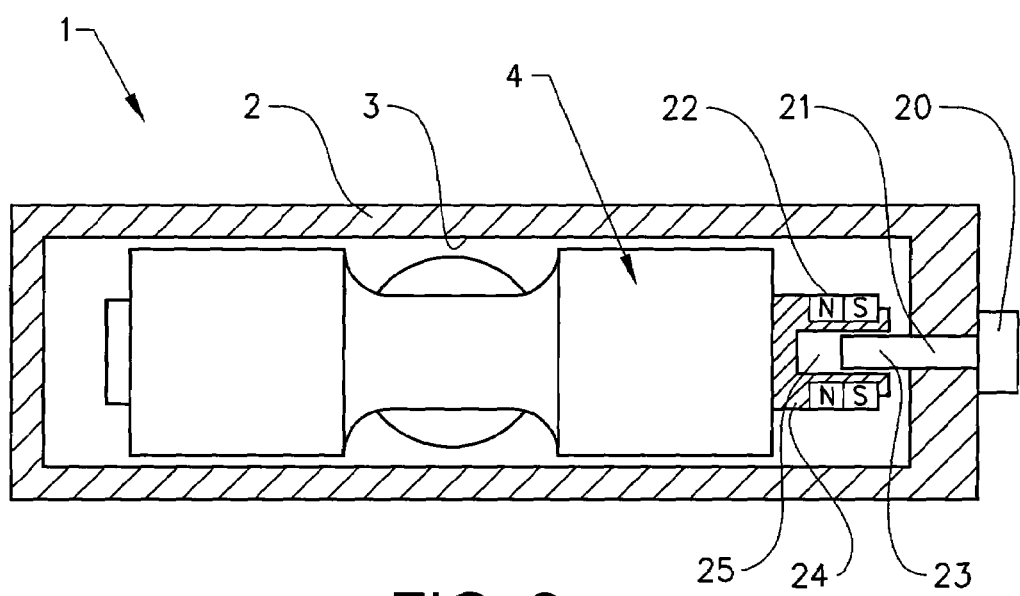
FIG. 2 shows a schematic illustration of a sensor arrangement according to a second embodiment of the invention.

FIG. 2 shows a schematic illustration of a sensor arrangement according to a second embodiment of the invention. In the same way as FIG. 1, FIG. 2 shows a fluid device in the form of a directional control valve 1. The directional control valve 1 comprises a wall 2 enclosing a cavity 3, which cavity contains a spool 4 displaceable by pressurized fluid selectively applied to the control valve 1. The device is provided with a sensor arrangement comprising a magnetic sensor 20, such as a Hall sensor, mounted outside the wall 2, a first sensor element 21 that is connected to the magnetic sensor 20 and extends through the wall 2 and a predetermined distance in a substantially axial direction into the cavity 3. The magnetic sensor 20 is arranged to detect the position of a second sensor element 22 located on the spool 4 by sensing a change in magnetic flux induced in the first sensor 21 element by the second sensor element 22.

In FIG. 2 the first sensor element 21 comprises a cylindrical body of a magnetically conductive material that extends substantially axially into the cavity 3. An end portion 23 of the first sensor element 21 extends into a recess 25 in an axially extending end portion 24 of the spool 4. The second sensor element 22 comprises a permanent magnet arranged in the outer peripheral surface of and axially extending end portion 24 of the spool 4. In this example, the second sensor element 22 is shown arranged around the entire periphery of the end portion 24. However, it is also possible to arrange the second sensor element along an axially extending recess in the outer surface of the end portion 24. Even if the end portion of the spool should be rotated about its axis, the radial distance between the end portion 23 of the first sensor element 21 and the second sensor element 22 remains constant. Hence it is sufficient to arrange the second sensor element 22 along a limited sector of the outer surface of the end portion 24.

Figure 3:
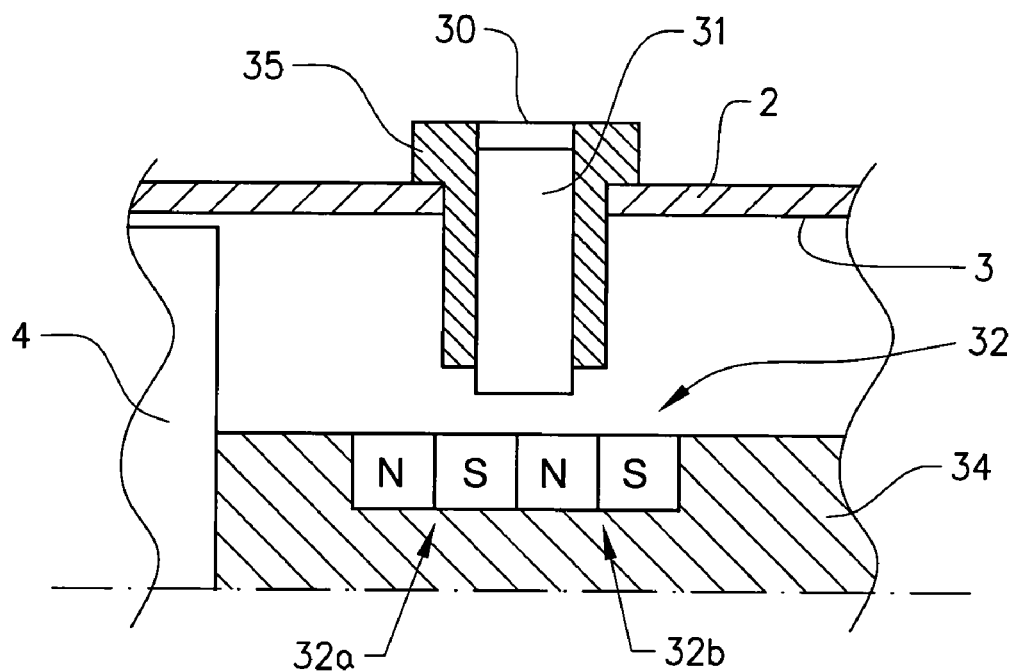
FIG. 3 shows an enlarged view of a first alternative sensor arrangement.

FIG. 3 shows an enlarged view of a first alternative sensor arrangement similar to that of FIG. 1. According to this example the sensor arrangement comprises a magnetic sensor 30 mounted outside the wall 2 and a first sensor element 31 that is connected to the magnetic sensor 30 and extends through the wall 2 and a predetermined distance into the cavity 3. The magnetic sensor 30 is arranged to detect the position of a second sensor element 32 located on an axially extending portion 34 of a spool 4 by sensing a change in magnetic flux induced in the first sensor 31 element by the second sensor element 32. In this case the wall 2 of the directional valve 1 comprises a magnetically conductive material. In order to allow the first sensor element 31 to conduct a magnetic field induced by the second sensor element 32 through the first sensor element 31 to the magnetic sensor 30, the first sensor element 31 is insulated from the wall by a casing 35 made from a suitable non-magnetic material. The casing 35, the first sensor element 31 and the magnetic sensor 30 can be made as a unit that is screwed into place in the wall 2 and connected to an electronic control unit (not shown). The outer end of the casing can be given a shape that allows it to be mounted with a standard tool and be provided with a flange having a contact surface that ensures that the first sensor element 31 is in position when the contact surface contacts the outer surface of the wall 2.

As indicated in FIG. 3, the second sensor element 32 can comprise more than one permanent magnet 32a, 32b. The magnetic sensor 30 is connected to an electronic control unit (not shown), which receives electrical pulses representing the change in magnetic flux induced in the first sensor element 31 by the magnets 32a, 32b making up the second sensor element 32. Based on these input signals and information relating to the fluid operation and current direction of movement of a spool 4, or a similar displaceable component, the electronic control unit can determine the position of the spool 4.

Figure 4:
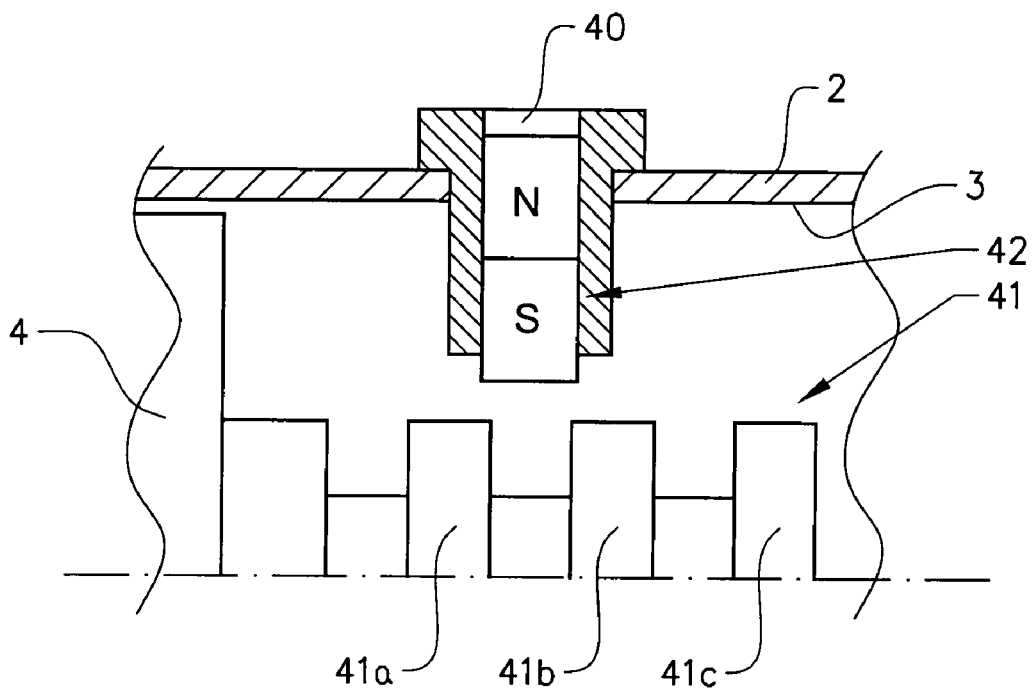
FIG. 4 shows an enlarged view of a second alternative sensor arrangement.

FIG. 4 shows an enlarged view of a second alternative sensor arrangement. According to this example the sensor arrangement comprises a magnetic sensor 40 mounted outside the wall 2 and a second sensor element 42 that is connected to the magnetic sensor 40 and extends through the wall 2 and a predetermined distance into the cavity 3. As opposed to the arrangement in FIG. 3, the second sensor element 42 comprises a magnet located in a fixed position in the wall 2. The magnetic sensor 40 is arranged to detect the position of at least one first sensor element 41 located on an axially extending portion 44 of a spool 4 by sensing a change in magnetic flux induced in the magnetic second sensor element 42 element by at least one first sensor element 41. In this case, the wall 2 of the directional valve 1 comprises a magnetically conductive material. In order to isolate the second sensor element 42 from the wall 2 and allow a disturbance in the magnetic field induced by the first sensor element 41 through the second sensor element 42, the second sensor element 42 is mounted in a casing 45 made from a suitable non-magnetic material.

The casing 45, the second sensor element 42 and the magnetic sensor 40 can be made as a unit that is screwed into place in the wall 2 and connected to an electronic control unit (not shown). The outer end of the casing can be given a shape that allows it to be mounted with a standard tool and be provided with a flange having a contact surface that ensures that the second sensor element 42 is in position when the contact surface contacts the outer surface of the wall 2.

As indicated in FIG. 4, the first sensor element 41 can comprise a number of axially separated elements 41a, 41b, 41c. The magnetic sensor 40 is connected to an electronic control unit (not shown), which receives electrical pulses representing the change in magnetic flux induced in the magnetic second sensor element 42 by the elements 41a, 41b, 41c making up the first sensor element 41. Based on these input signals and information relating to the fluid operation and current direction of movement of a spool 4, or a similar displaceable component, the electronic control unit can determine the position of the spool 4.

This may be achieved by arranging the magnetic sensor 40 to detect the position and direction of movement of each of the consecutive and separated peripheral first sensor elements 41a, 41b, 41c arranged along the longitudinal axis of the spool 4 as they move past the magnetic second sensor element 42. The second sensor element 42 comprises a single magnetic body, while the consecutive first sensor elements 41a, 41b, 41c comprise a number of material sections of a predetermined shape arranged at the same distance from the longitudinal axis and a predetermined axial thickness. According to the example shown in FIG. 4, the consecutive elements comprise a number of discs having the same diameter and equal thickness.

The invention is not limited to the above examples, but may be varied freely within the scope of the appended claims. For instance, the consecutive elements of FIG. 4 may be arranged at different distances from the longitudinal axis. Alternatively, the consecutive elements may comprise a number of stepped cylindrical surfaces having successively reduced diameters, each with an equal axial extension.

What is claimed is:

1. Sensor arrangement arranged to detect at least one position of a displaceable component in a fluid device, which fluid device comprises a wall enclosing a cavity, in which cavity the component is displaced by pressurized fluid selectively applied to the component, the sensor arrangement comprising a magnetic sensor mounted outside the wall and a first sensor element that is connected to the magnetic sensor and extends through the wall and a predetermined distance into the cavity, wherein the magnetic sensor is arranged to detect the position of at least one predetermined second sensor element located on the displaceable component by sensing a change in magnetic flux induced in the first sensor element by the second sensor element.

2. Sensor arrangement according to claim 1, wherein the first sensor element is a magnetically conductive material.

3. Sensor arrangement according to claim 2, wherein the second sensor element is a magnet.

4. Sensor arrangement according to claim 1, wherein the first sensor element is a magnet.

5. Sensor arrangement according to claim 4, wherein the second sensor element is a magnetically conductive material.

6. Sensor arrangement according to claim 1, wherein the magnetic sensor is mounted on an outer surface of the wall.

7. Sensor arrangement according to claim 1, wherein the first sensor element is separated from the wall by a non-magnetic material.

8. Sensor arrangement according to claim 7, wherein the first sensor element is a cylindrical body mounted in a non-magnetic casing.

9. Sensor arrangement according to claim 1, wherein the change in the magnetic flux in the first sensor element is proportional to the distance between the second sensor element and first sensor element.

10. Sensor arrangement according to claim 9, wherein the displaceable component is displaceable along a longitudinal axis and the second sensor element is an end surface of the displaceable component.

11. Sensor arrangement according to claim 9, wherein the displaceable component is arranged to be displaceable along a longitudinal axis and the second sensor element comprises at least one peripheral element on the displaceable component.

12. Sensor arrangement according claim 11, wherein the magnetic sensor is arranged to detect the position of each of a number of consecutive and separated peripheral second sensor elements along the longitudinal axis.

13. Sensor arrangement according to claim 12, wherein the consecutive surfaces are arranged at an equal distance from the longitudinal axis.

14. Sensor arrangement according to claim 12, wherein the consecutive surfaces are arranged at different distances from the longitudinal axis.

15. Fluid device comprising a sensor arrangement according to claim 1.

16. Fluid device according to claim 15, wherein the fluid device is a spool valve, a position of the spool is detected by the sensor arrangement.

17. Fluid device according to claim 15, the fluid device is a fluid cylinder-piston device, a position of the piston is detected by the sensor arrangement.

* * * * *